United States Patent
Swain

(10) Patent No.: US 7,782,800 B2
(45) Date of Patent: Aug. 24, 2010

(54) DISCOVERY, DETECTION, AND MANAGEMENT OF DAISY-CHAIN SYSTEM TOPOLOGY

(75) Inventor: Tushara K. Swain, Orissa (IN)

(73) Assignee: Texas Instruments Incorporated, Dallas, TX (US)

( * ) Notice: Subject to any disclaimer, the term of this patent is extended or adjusted under 35 U.S.C. 154(b) by 730 days.

(21) Appl. No.: 11/615,302

(22) Filed: Dec. 22, 2006

(65) Prior Publication Data

US 2008/0155073 A1 Jun. 26, 2008

(51) Int. Cl.
*H04L 12/28* (2006.01)
*G06F 15/177* (2006.01)

(52) U.S. Cl. ...................... 370/257; 709/222
(58) Field of Classification Search ........................ None
See application file for complete search history.

(56) References Cited

U.S. PATENT DOCUMENTS

| | | | |
|---|---|---|---|
| 5,422,885 A | 6/1995 | Nadkarn | |
| 6,594,044 B1* | 7/2003 | Buchanan et al. | 398/58 |
| 6,636,499 B1 | 10/2003 | Dowling | |
| 7,319,664 B2* | 1/2008 | Chen et al. | 370/217 |
| 7,336,622 B1* | 2/2008 | Fallis et al. | 370/252 |
| 7,570,601 B2* | 8/2009 | Baird et al. | 370/254 |
| 7,688,716 B2* | 3/2010 | Pande et al. | 370/222 |
| 2004/0062257 A1* | 4/2004 | Nguyen | 370/403 |
| 2005/0030902 A1* | 2/2005 | Choi et al. | 370/252 |
| 2005/0198235 A1* | 9/2005 | Kumar et al. | 709/222 |
| 2005/0198373 A1* | 9/2005 | Saunderson et al. | 709/238 |
| 2005/0271044 A1* | 12/2005 | Hsu et al. | 370/360 |
| 2005/0278566 A1* | 12/2005 | Jones et al. | 714/9 |
| 2006/0092853 A1* | 5/2006 | Santoso et al. | 370/252 |
| 2006/0271805 A1 | 11/2006 | Pearce et al. | |
| 2007/0081463 A1* | 4/2007 | Bohra et al. | 370/235 |
| 2007/0206630 A1* | 9/2007 | Bird | 370/465 |

OTHER PUBLICATIONS

U.S. Patent Application, Entitled "Auto-Configuration Of Daisy-Chained Devices," filed Dec. 22, 2006, including four pages of formal drawings.
U.S. Patent Application, Entitled "Control Token Based Management Of Daisy-Chained System Topology," filed Dec. 22, 2006, including six pages of formal drawings.

* cited by examiner

*Primary Examiner*—Pankaj Kumar
*Assistant Examiner*—Marcus R Smith
(74) *Attorney, Agent, or Firm*—Steven A. Shaw; W. James Brady; Frederick J. Telecky, Jr.

(57) ABSTRACT

Devices and methods are disclosed for detection and management of daisy-chain system topologies. A method is disclosed for auto-discovery and auto-enumeration. The method may be performed in a daisy-chain system of serially inter-connected devices. The method may include identifying each port of each device in a system of serially inter-connected devices, discovering each device in the system, and enumerating each device in the system.

18 Claims, 6 Drawing Sheets

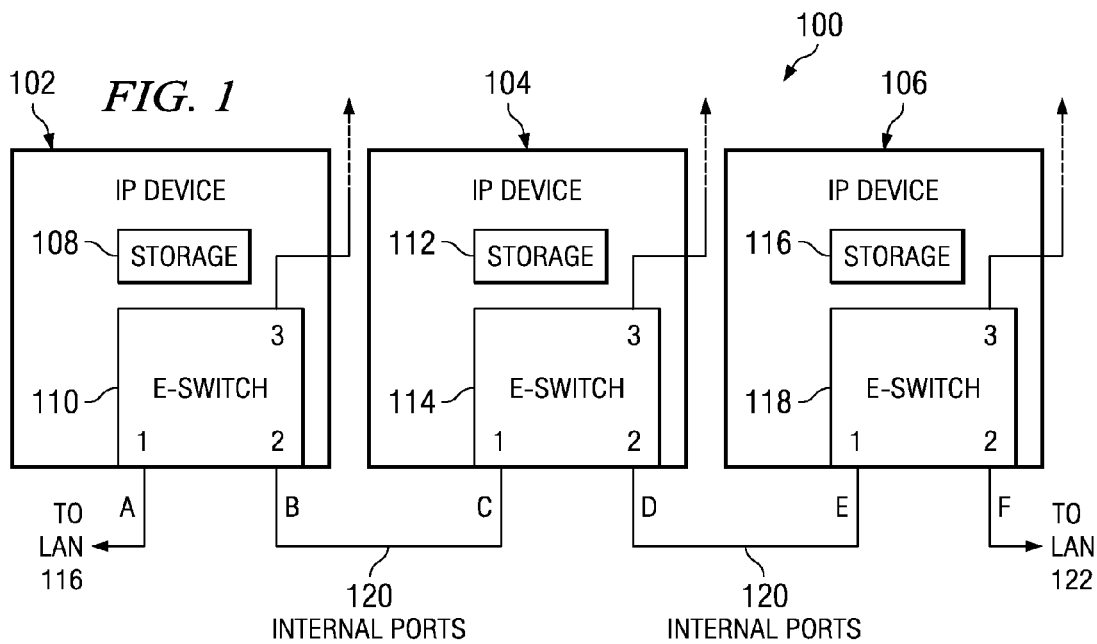
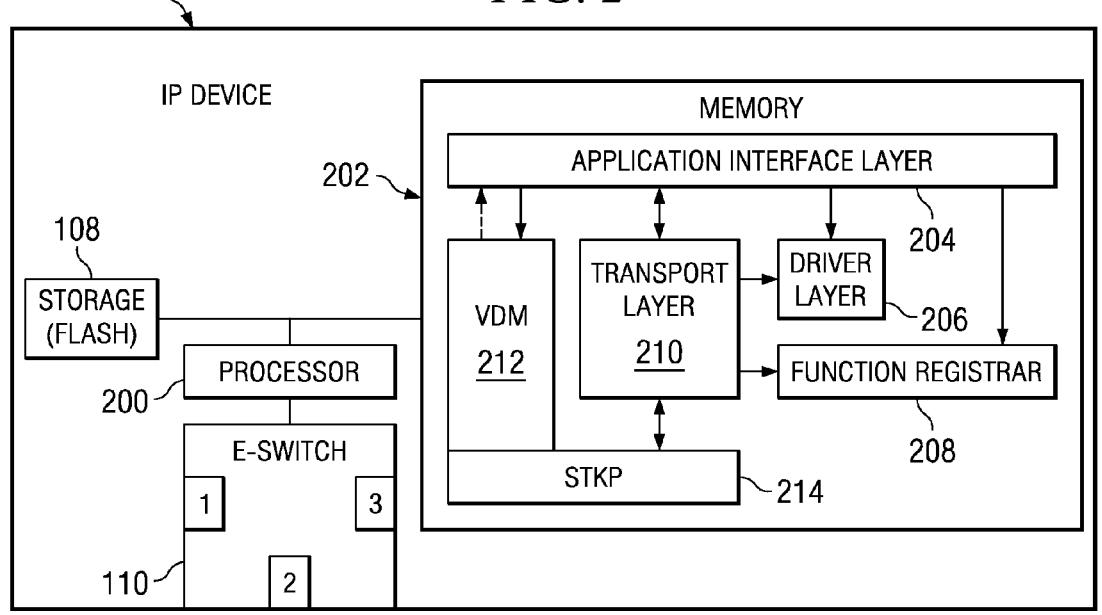

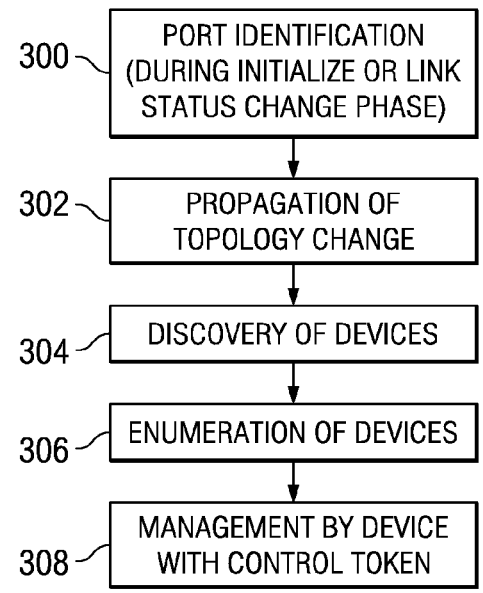
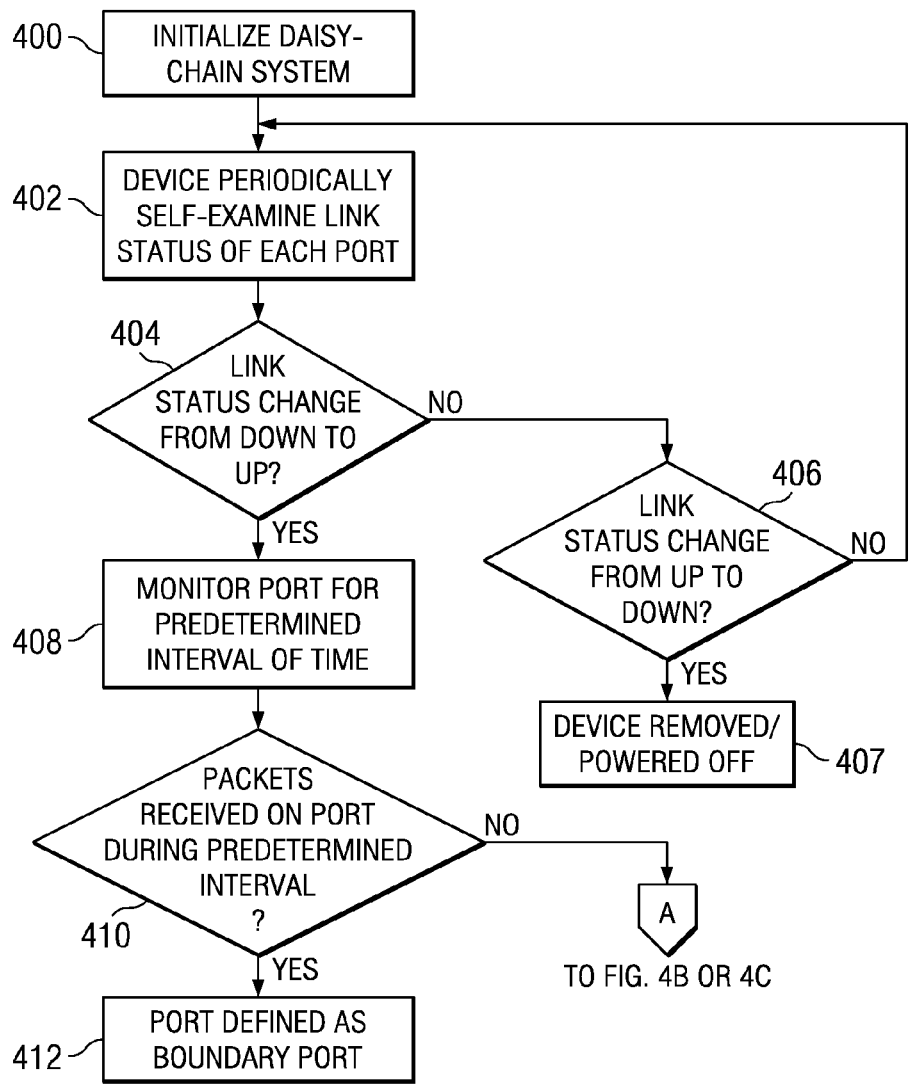

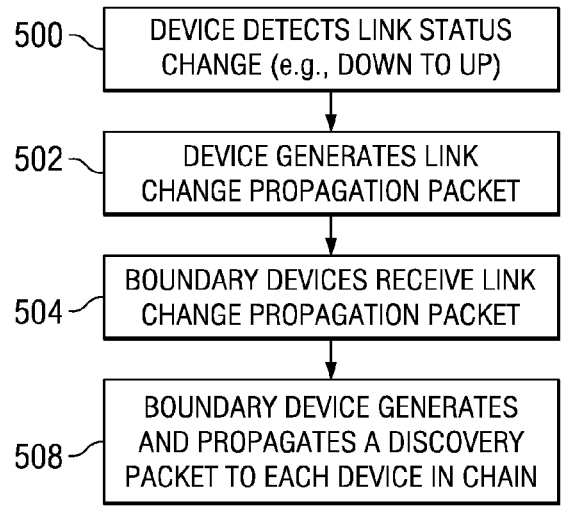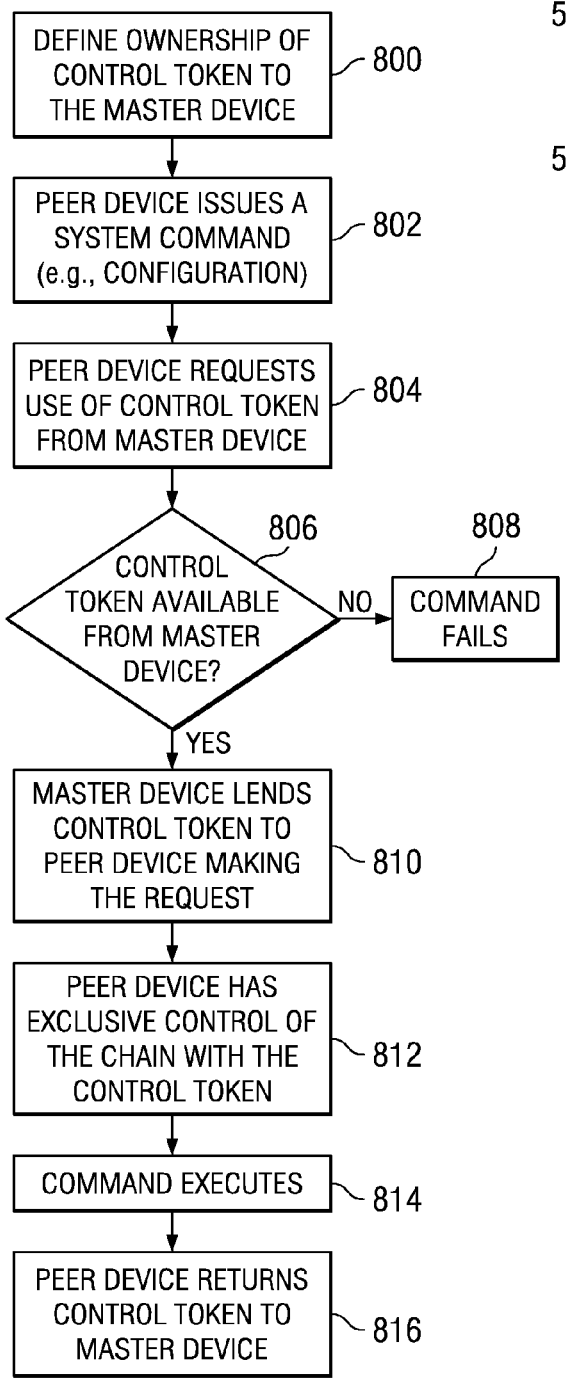

DISCOVERY, DETECTION, AND MANAGEMENT OF DAISY-CHAIN SYSTEM TOPOLOGY

CROSS-REFERENCE TO RELATED APPLICATIONS

This application includes subject matter that may be related to one or more of the following applications, which is hereby incorporated by reference:

U.S. patent application Ser. No. 11/615,323, filed Dec. 22, 2006, entitled "Control Token Based Management of Daisy-chain System Topology," by Tushara Swain; and U.S. patent application Ser. No. 11/615,265, filed Dec. 22, 2006, entitled "Auto-configuration of Daisy-Chain Devices," by Tushara Swain.

BACKGROUND

"Daisy-chain stacking" is a wiring scheme for inter-connecting similar devices, such as in a Local Area Network ("LAN"). One example of daisy-chain device installations are Internet Protocol ("IP") telephones and Ethernet switches in a LAN. Some networks typically involve configuration and management activities. Configuration may include, for example, setting up one or more IP telephones and/or Ethernet switches in a LAN, and management may include, for example, adding or removing telephones, or altering various parameters or operational software for operating the telephones in the LAN. In various installations, a daisy-chain may include hundreds of devices, making configuration and management of the devices burdensome and/or complex. At present, configuration information for each device in a LAN is stored in some form of storage, such as flash memory in each device, and may be provided initially and then altered subsequently by manual modifications either locally or remotely over the LAN. Such configuration activities are cumbersome.

SUMMARY

Accordingly, disclosed herein are systems, devices and methods for detection and management of daisy-chain system topologies. For example, a method is disclosed for auto-discovery and auto-enumeration. The method may be performed in a daisy-chain system of serially inter-connected devices. The method may include identifying each port of each device in a system of serially inter-connected devices, discovering each device in the system, and enumerating each device in the system.

In an embodiment, a device is disclosed that may be used in a daisy-chain system. The device may include an ethernet switch having at least two ports, and a control logic operable for auto-discovery and auto-enumeration. The control logic is operable to identify each of the ports as an internal port or a boundary port, discover any device connected in a serial fashion to any identified internal port, and enumerate any such discovered device connected in a serial fashion to any identified internal port.

In still another embodiment, a daisy-chain system is disclosed. The daisy-chain system may include a plurality of devices serially inter-connected together. The boundaries of the system may be defined by a first boundary port of a first device in the system and a second boundary port of a second device in the system. Each device in the system may be operable for auto-discovery and auto-enumeration. Each device may include an ethernet switch having at least two ports, and a control logic. The control logic is operable to identify each of the ports as an internal port or a boundary port, discover any device connected in a serial fashion to any identified internal port, and enumerate any such discovered device connected in a serial fashion to any identified internal port.

BRIEF DESCRIPTION OF THE DRAWINGS

For a detailed description of exemplary embodiments of the invention, reference will now be made to the accompanying drawings in which:

FIG. 1 shows a block diagram of a daisy-chain system in accordance with one or more embodiments.

FIG. 2 shows a block diagram of an illustrative device which may be used in the daisy-chain system of FIG. 1 in accordance with one or more embodiments.

FIG. 3 shows a flow chart of a method for detection and management of daisy-chain system topology in accordance with one or more embodiments.

FIGS. 4A, 4B and 4C show flow charts of a method for port identification in detection and management of daisy-chain system topology in accordance with one or more embodiments.

FIG. 5 shows a flow chart of a method of system topology change propagation in detection and management of daisy-chain system topology in accordance with one or more embodiments.

FIG. 8 shows a flow chart of a method of control token-based management of daisy-chain system topology in accordance with one or more embodiments.

NOTATION AND NOMENCLATURE

Figure 4B:
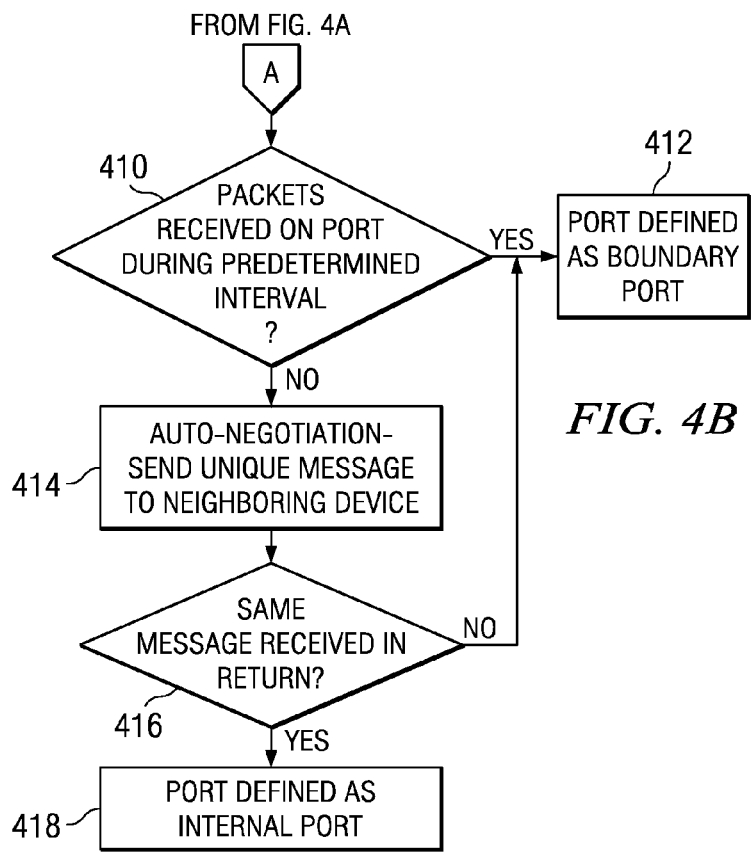

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to an operative collection of two or more parts and may be used to refer to an entire system, a portion of such a system, a computer network, a portion of a computer network, or a series of daisy-chain ethernet based devices.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

It is useful, for ease of configuration and management, to treat devices inter-connected to form a daisy-chain system as a single virtual device. The methods, devices, and systems of this disclosure enable autonomous detection of existing daisy-chain topologies as well as autonomous detection of any change in system topology with the addition or removal of any devices in the daisy-chain system. With the topology of the daisy-chain system known, the daisy-chain devices may be treated and managed as a single virtual device. A method for management of the daisy-chain system based on a control token is also disclosed herein, ensuring uniformity and synchronization across the system. In illustrative embodiments herein, the daisy-chain devices include a series of Internet Protocol (IP) telephones having Ethernet switches. Such illustrative embodiments are not intended to be limiting, however, as this disclosure extends to any ethernet-based devices inter-connected in a serial fashion comprising a daisy-chained system.

FIG. 1 shows a block diagram of three similar devices, Device 102, Device 104, and Device 106 inter-connected in a serial fashion to form a daisy-chain system 100. While three devices are shown for illustrative purposes, any number of devices may be inter-connected together in such a fashion as shown, or otherwise as is well known by one of skill in the art. Port A of Device 102 is connected to the external world, i.e., to a LAN or PC 116. Similarly Port F of Device 106 is connected to the external world 122. Port A and Port F thus define the boundaries of the daisy-chain system 100, and may be referred to as the "boundary ports," while the remaining ports (Ports B, C, D, and E) are referred to as "internal ports 120." A stacking protocol, implemented in software stored on each device, executes within each of the devices. The stacking protocol comprises a means by which the daisy-chain system topology is discovered, each device is enumerated, and a master device is defined. The stacking protocol also interacts with a virtual device manager, implemented as a software module, to manage and configure the system based on the known topology.

Each device 102, 104, 106 includes storage 108, 112, and 116 respectively such as a flash memory or other form of non-volatile storage such as a hard drive, any form of read-only memory (ROM), or any type of magnetic storage device. Each device 102-106 also includes an Ethernet switch 110, 114, 116 respectively that preferably has at least two Ethernet ports, although more than two ports are possible. Devices such as the TNETV1050 or TNETV1055 IP telephones provided by Texas Instruments may be used. Of the ports included in the device, at least one port optionally may be a virtual port.

Each port A-F has an associated link status that is indicative of whether the port is operational. The link status of a given port is reflected in one or more link status bits for that port. If a device that is operational (configured and functional) and turned on, the link status bit for the ports will indicate that the port is "UP." If, however, the device is not operational, either because it is not properly configured or is powered off, the link status bit for each of its ports will indicate that the port is "DOWN."

The topology of the daisy-chain system changes dynamically with the addition or removal of a device in the chain. Any addition or removal of a device changes the link status of the port where the device is added or removed, and thereby causes a change in the existing daisy-chain system topology. Specifically, when a device is added or removed, the link status changes for its own port that is coupled to the rest of the daisy-chain system. For example, if Device 106 were added to the daisy-chain of FIG. 1, the link status for port E, where it couples to the other devices, would change. Simply powering up or powering down a device may also change the system topology, because doing so changes the link status of the ports in the affected device. If a device is powered up or a new device is added to the daisy-chain system, the link status of the port that couples the device to the daisy-chain system changes from "DOWN" to "UP." Similarly, if a device is removed, the link status of the port that had coupled the device to the daisy-chain system changes from "UP" to "DOWN."

FIG. 2 shows a block diagram device 102 of the daisy-chained system of FIG. 1, illustrating the software architecture that carries out methods of various embodiments of this disclosure. The embodiment shown in FIG. 2 may apply to all such devices 102-106. The device 102 includes the storage 108 that stores the configuration information for the device 102. The device 102 also includes the Ethernet switch 110, or "e-switch", having three ports 1, 2 and 3 in the embodiment of FIG. 2. The device 102 also includes a processor 200 that executes software stored in a memory 202 that carries out various methods in accordance with embodiments of this disclosure. The software architecture that carries out methods according to this disclosure includes an Application Interface Layer 204, a Driver Layer 206, a Function Registrar 208, a Transport Layer 210, a Virtual Device Manager ("VDM") 212, and a Stacking Protocol ("STKP") 214, each of which will be discussed in turn herein. The virtual device information on any individual device in the daisy-chain is maintained locally with the help of the Stacking Protocol 214, and may be obtained by querying the VDM 212, which will be discussed in further detail below.

The Application Interface Layer 204 is software abstraction layer. If an upper layer entity, such as the Stacking Protocol 214 attempts to send or receive a packet, the Stacking Protocol 214 calls a function provided in the Application Interface Layer 204. For example, if an upper layer attempts to send a packet on any of the ports, the layer will call an Application Interface Layer 204 function with arguments "port" and "address of packet buffer." The Application Interface Layer's 204 internal implementation resolves it to device id and port number with the help of virtual device software architecture and sends the packet to the appropriate device identifier and port in the daisy-chain system.

The Driver Layer 206 consists of actual driver APIs. The Driver Registrar (not shown) of the Driver Layer 206 maintains a mapping of the driver APIs with numbers. In various embodiments, this mapping may be same for all devices in the daisy-chain. In an example, it is desirable to set a particular feature of a particular port and particular device identifier by setting a value. A certain driver API in the Driver Layer 206 is registered with a given number for that feature. A configuration packet may be directed to the device that includes the number for the feature, the port identifier and the device identifier, and when the transport layer 210 at that device receives the packet, the packet is decoded and determined to be a configuration message. The device may then reference its own Driver Registrar to determine which driver API corresponds to the number in the packet, and then call the identified driver API with the arguments being the port number and value passed in the configuration message. Further discussion of configuration may be found in related U.S. patent application Ser. No. 11/615,265, filed Dec. 22, 2006, entitled "Auto-configuration of Daisy-Chain Devices," by Tushara Swain.

The Function Registrar 208 builds or contains a database of functions (or APIs) that may be executed by processor 200. The APIs are stored with a module identifier and a function identifier according to a function index. The API functions, when executed by the processor, perform various functions such as managing or configuring the device 102.

Framing of packets for configuration PDUs is performed at the Transport Layer 210. The Transport Layer 210 prepends the multicast address, source address and type of message to each command message. The Transport Layer 210 also builds configuration messages based on information obtained from the VDM, as well as decodes incoming configuration messages. The Transport Layer 210 also sends and receives command Protocol Data Units ("PDUs") to and from the Stacking Protocol 208. After receiving a PDU, the Transport Layer 210 determines whether a configuration packet is to be further forwarded to other ports, which will be discussed in more detail below.

The VDM 212 interacts with the Stacking Protocol 214 to update the device information. The VDM 212 includes a self-device identifier. Any change to the stacking state (i.e., a device's own status and configuration in the overall system topology) is reflected in the VDM 212.

The Stacking Protocol 214 discovers the daisy-chain system topology in a dynamic manner, as discussed in greater detail below. The Stacking Protocol 214 is also used as a transport medium for configuration Protocol Data Units ("PDUs") once the system topology has been discovered and the daisy-chain system is managed by the Virtual Device Manager 212. The PDUs are encapsulated packets which may be used, for example, to forward configuration commands from one device to another.

FIG. 3 shows an overview of a method for detection and management of daisy-chain system topology in accordance with one or more embodiments. Each block of the method will be discussed in greater detail with reference to the remaining figures. The method begins with a port identification stage (block 300) in which all ports are identified. Port identification may take place, for example, during initialization of the daisy-chain system when the system is arranged and powered on, or during a link status change at some point in time after the system has been initialized. With each device having identified its ports, any subsequent change to the system topology is propagated to each device in the daisy-chain system (block 302). In block 304, the method proceeds with discovery of devices in the daisy-chain system.

In block 306, the devices are enumerated. Thereafter, each device may periodically perform a check to determine if any change has been implemented, such as adding or removing a device, or powering a device up or down, returning to block 300.

With the system topology known by each device in the daisy-chain system, management of the daisy-chain as a whole, as if the daisy-chain were a single virtual device, may be achieved with a control token based method (block 308). A master device in the daisy-chain system, discussed further below, owns the control token, and lends it to one peer device at a time for use in executing API functions on other devices, thereby achieving uniformity of configuration throughout the daisy-chain system.

Port Identification

Figure 4C:
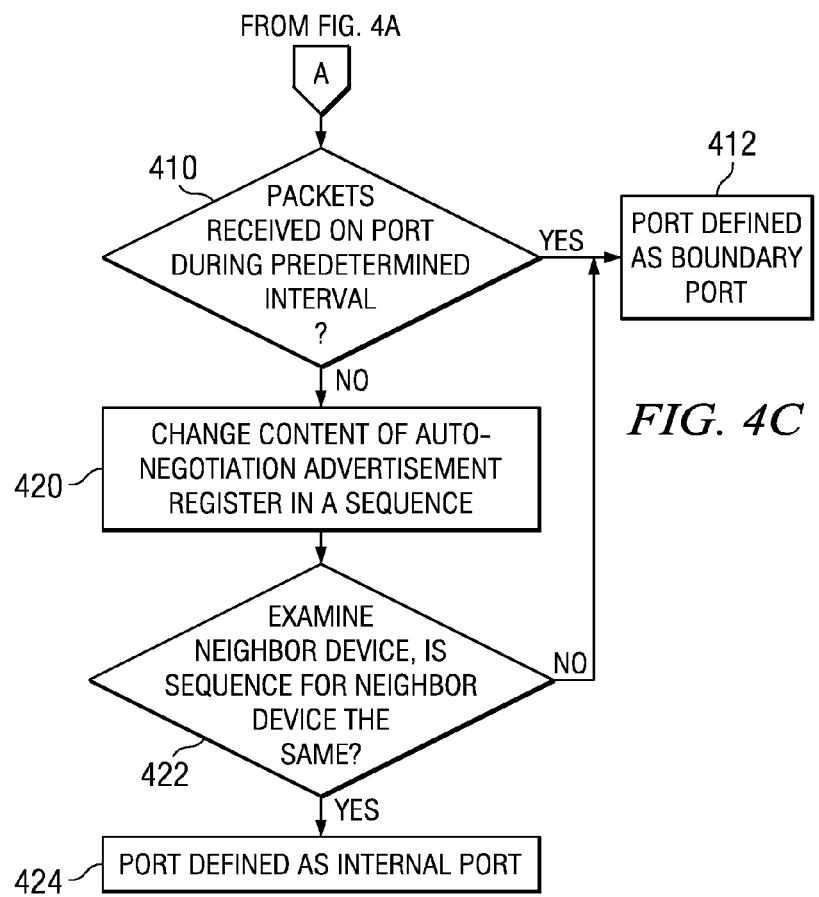

Referring now to FIGS. 4A-4C, flowcharts are shown for methods of port identification in a daisy-chain system topology. The method depicted in FIG. 4A is a preferred embodiment of block 300 of FIG. 3. Generally, each device determines whether its ports are internal ports or boundary ports for establishing the system topology. The method of port identification begins with initializing the daisy-chain system (block 400). Initialization may include, for example, physically setting up the daisy-chain system and/or powering up the devices of the daisy-chain system. Powering up the devices of the daisy-chain system may be performed manually at the device by a person or remotely by a person with a control device. Upon initialization and periodically thereafter, each device examines a link status bit on each of its ports, checking for a change in link status (block 402). As stated, adding or removing a device changes the link status of the port where the device is added or removed, and powering up or powering down a device also changes the link status of the ports in the affected device. Each of the remaining blocks of the illustrative method of FIG. 4A are performed for each port of the device.

The device determines whether the link status change is from DOWN to UP (block 404). If the link status change is not from DOWN to UP, the device determines whether the link status change is from UP to DOWN (block 406). If the link status change is from UP to DOWN, the device has been removed or powered off, and a system topology change is indicated (block 407). The port of the neighboring device to which the now-powered off device was coupled is then defined as a boundary device. The neighboring device that remains in the daisy-chain system (i.e., with link status UP) will propagate the change by virtue of the fact that its port connecting to the removed/powered off device changes link status, and becomes a boundary port. If the link status has not changed from DOWN to UP, or UP to DOWN (at 404 and 406), no system topology change is indicated. Each device will periodically check its link status, returning to block 402.

Returning to block 404, if the link status change is from DOWN to UP, the device monitors the port for a predetermined interval of time (block 408), and determines whether any packets are received on the port during the predetermined interval of time (block 410). The predetermined interval of time is a configurable parameter that could be set to a value suitable for the particular installation network. In an example, the predetermined interval of time could be 15-20 seconds. If packets are received on the port during the predetermined interval of time, the examined port is determined to be a boundary port (block 412). Otherwise, if packets are not received during the predetermined interval of time, additional role port identification steps may be taken (see FIGS. 4B and 4C), or the port may be determined to be an internal port. It is preferable, however, to take additional steps in port identification since it is possible that no packets are received, but the device is actually a boundary device.

Referring now to FIG. 4B, a flowchart is shown for further optional steps for the method of port identification in a daisy-chain system topology shown in FIG. 4A. The "next page" feature of IEEE 802.3 auto-negotiation may be used to pass a message to the neighboring device (i.e., a link partner), with the expectation that the same message will be returned. If the same message is received from the link partner, the port is determined to be an internal port, but if the same message is not received from the link partner, the port is determined to be a boundary port. As shown in FIG. 4B, and continuing from FIG. 4A, the device, at block 410, determines whether any packets are received on the examined port during the predetermined interval of time, and if packets are received on the port during the predetermined interval of time, the port is determined to be a boundary port as discussed above (block 412). If no packets are received on the examined port during the predetermined interval of time, the device sends a unique auto-negotiation message to the neighboring device on the examined port (block 414). The port then waits for the same message to be received in return from the neighboring device, according to auto-negotiation techniques known in the art. The device determines if the same message is received in return (block 416), and if the same message is not received in return, the port is determined to be a boundary port (block 412). If the same unique message is received in return (block 416), the port is determined to be an internal port (block 418).

Referring now to FIG. 4C, a flowchart shows an alternative embodiment to that depicted in FIG. 4B. In this alternative embodiment, the link partner advertisement and auto negotiation advertisement feature of IEEE 802.3 auto-negotiation may be used for port identification. In such an embodiment, the content of the auto-negotiation advertisement register is changed sequentially with some time interval gap to various speeds and duplex modes to auto-negotiate with the link partner. The link partner is expected to advertise and auto-negotiate in the same sequence. If the sequence of advertisement and link partner advertisement is the same sequence, then the port is determined to be an internal port, and if the sequence is not the same, the port is determined to be a boundary port. Optionally, the steps of FIG. 4C may be taken in addition to the steps taken in FIG. 4B.

As shown in FIG. 4C, and continuing from FIG. 4A (or alternatively from block 416 of FIG. 4B), the device, at block 410, determines whether any packets are received on the examined port during the predetermined interval of time, and if yes, the port is determined to be a boundary port as discussed above (block 412). If packets are not received on the examined port during the predetermined interval of time, the device changes the content of the auto-negotiation advertisement register in a sequence, the sequence being advertised to a neighboring device on the examined port (block 420). The device receives a sequence broadcasted back from the neighboring device, and examines the sequence from the neighboring device to determine whether the sequences are the same (block 422). If the sequences are not the same, the port is determined to be a boundary port (block 412). If the sequences of changes to the auto-negotiation advertisement register are the same, the port is determined to be an internal port (block 424).

Topology Change Propagation

Referring now to FIG. 5, a flowchart is shown for a method of topology change propagation in a daisy-chain system topology (i.e., block 302 of FIG. 3). The process described with respect to FIG. 5 may be an optional process in FIG. 3, in other words, block 302 may be optional in some embodiments. With the boundary ports identified and boundary devices identified, a master device for the daisy-chain system is defined such that the discovery propagation packet may be sent in only one direction. Specifically, both boundary devices start the discovery process after receiving the link change propagation packet, by generating discovery propagation packets in both directions, and the source MAC addresses of the discovery propagation packets are compared to only propagate the device information in one direction, from the master device. The boundary device with the lesser MAC address is determined to be the master device that has the right to propagate the information used to discover and the devices in the daisy-chain system.

Specifically, the method begins with the device detecting a link status change, e.g., from DOWN to UP (block 500). The device generates a link change propagation packet (block 502). For any change in link status of a port, the affected device generates a link change propagation packet that is propagated to all devices in the daisy-chain system until it reaches the boundary device of the system. The boundary devices receive the link change propagation packet (block 504). After receiving the link change propagation packet, the master device generates and propagates discovery propagation packet on its internal port to discover and enumerate the devices in the daisy-chain system (block 506), as explained with respect to FIG. 6.

The master device is also responsible for enumerating the devices in the daisy-chain system. When the devices in the daisy-chain system have been enumerated by the master device, each device in the daisy-chain becomes aware of the entire daisy-chain system topology, having a list of each of the devices that can be reached on its UPSTREAM port and its DOWNSTREAM port. For each device in a daisy-chain system, the port that is closer to the master device is the UPSTREAM port, and the other port is the DOWNSTREAM port. In this fashion, each device in the system is representative of the others in the daisy-chain system, and thus the daisy-chain system may be viewed and managed as a single virtual device.

A discovery packet (either propagation or enumeration) format includes a multicast address, a source address, a length, a type, and a field including a device identifier (prpg) and a flag for device identifier (enum). When the flag is set to "0," the device identifier in prpg is an advertised device identifier. When the flag is set to "1," the device identifier in prpg is an actual device identifier. A discovery propagation packet is a type of packet with all the flag (i.e., enum) values set to "0," while a discovery enumeration packet is a type of packet having at least one flag (i.e., enum) value set to a non-zero value.

Generally speaking, when a packet is received on any port of a device, it is checked for whether the packet is a discovery type packet, and whether it is a link change packet type. If the packet type is a discovery packet, the packet is forwarded to the discovery engine of the stacking protocol, while if the packet type is a link change propagation packet, the packet is forwarded to the link change propagation mechanism of the stacking protocol. If the packet is an ordinary packet, and the device is not in a discovery state (indicating that the daisy-chain system is in the process of detecting the system topology), then the ports of the device proceed with normal operation. Then the port is checked for its discovery status. If the port is already discovered, the packet is dropped. If the port is not already discovered, the port becomes a boundary port, and the associated variables are modified accordingly in the packet to continue with discovery and enumeration.

Discovery and Enumeration

Figure 6:
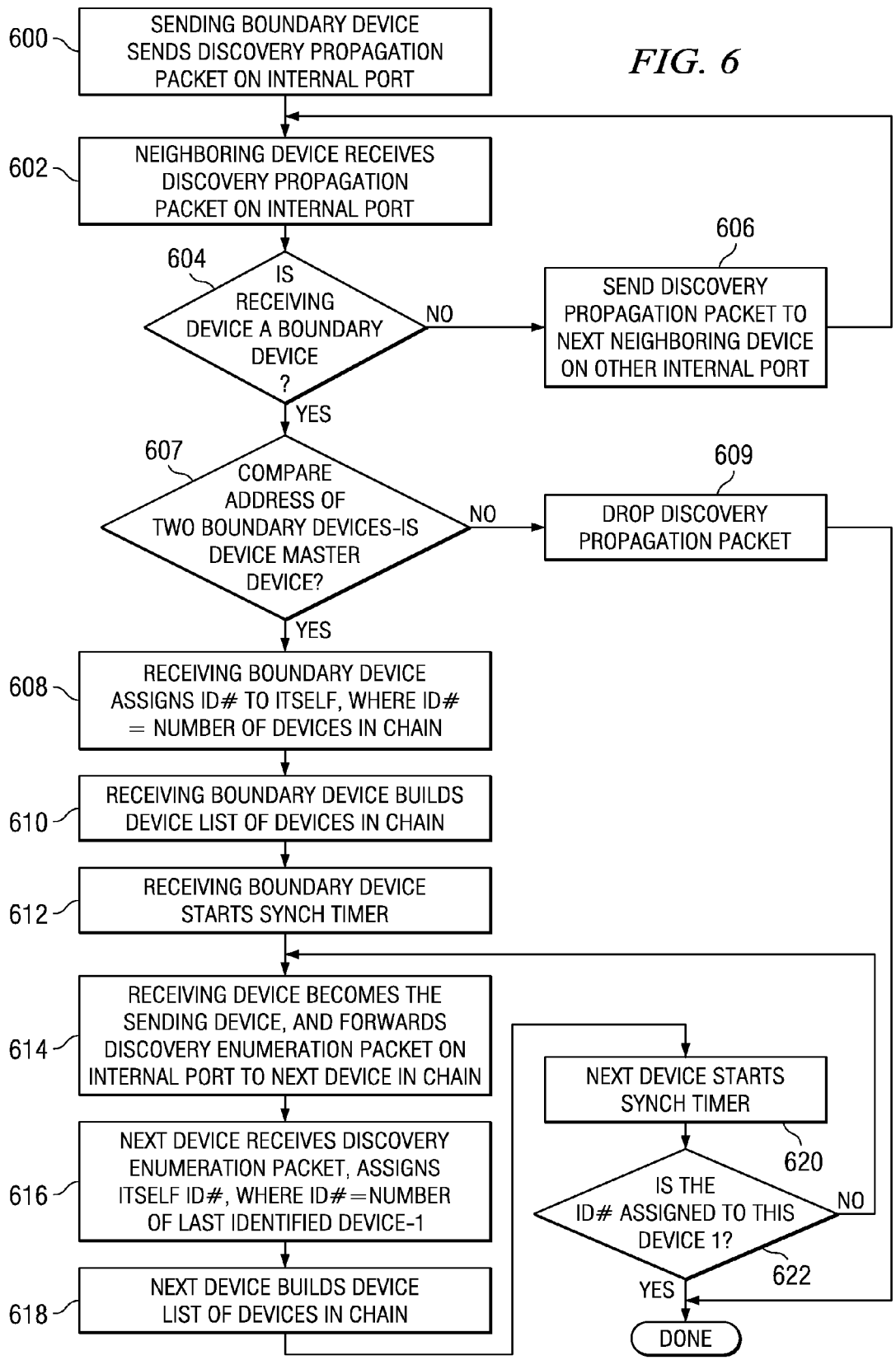
FIG. 6 shows a flow chart of a method of discovery and enumeration in detection and management of daisy-chain system topology in accordance with one or more embodiments.

Referring now to FIG. 6, a flowchart is shown for an illustrative embodiment of a method of the device discovery and enumeration in a daisy-chain system topology (i.e., blocks 304 and 306 of FIG. 3). At block 600, one boundary device (e.g., the master device, as described below) sends a discovery propagation packet on its internal port. The next device in the daisy-chain system, the neighboring device, receives the discovery propagation packet on the internal port (block 602). A check is performed by the receiving device to determine whether the receiving neighboring device is a boundary device (block 604). In various embodiments, the check of block 604 may include one or more steps in the port identification described above. If the receiving neighboring device is not a boundary device, the neighboring device forwards the discovery propagation packet on to the next device in the daisy-chain system on its other internal port (block 606), and the process returns to 602, as the next device in the daisy-chain system becomes the neighboring device. The process of blocks 602-606 repeats in each direction until both boundary devices are identified (i.e., until the second boundary device is identified).

If the receiving neighboring device is the second boundary device at block 604, a comparison is performed to determine if the boundary device is the master device (block 607), which may be performed by comparing the MAC address for the two boundary devices and selecting the master device as the device with the lesser MAC address, for example. If the device is not the master device, the discovery propagation packet is dropped (block 609). If the device is the master device, the receiving boundary device assigns an identification number to itself (block 608). The identification number the second boundary device assigns to itself is equal to, in some embodiments, the total number of devices in the daisy-chain system, which is known from the discovery propagation packet that has been passed to each device in the daisy-chain system. In an embodiment, each device in the daisy-chain system is then identified with an identification number one less than the previous device, until the first boundary device (e.g., the master device) is identified as device 1.

The receiving boundary device also builds a device list of the devices in the daisy-chain system, based on the information in the discovery propagation packet (block 610), and starts a synchronization timer (block 612). This receiving boundary device becomes the sending device, and forwards a discovery enumeration packet on its internal port to the next device in the daisy-chain system (block 614). The next device in the daisy-chain system thus becomes the receiving device that receives the discovery enumeration packet, and assigns to itself an identification number (block 616), where the identification number is the identification number of the last identified device minus one (e.g., counting backwards back through the daisy-chain system to the other boundary device). The device also builds a device list of the devices in the daisy-chain system based on information in the device enumeration packet (block 618), and starts a synchronization timer (block 620). A check is performed to determine if the identification number assigned to the device is "1," which indicates that the device is the first boundary device (e.g., the master device), and each device in the daisy-chain system has been discovered and enumerated (block 622). If yes, the method is complete. If the identification number assigned to the device is not "1," the method returns to block 614, and the device becomes the sender, and forwards the discovery enumeration packet on its internal port to the next device in the daisy-chain system, and so on, until each device in the daisy-chain system has been so discovered and enumerated.

The following example illustrates the process. In the system embodiment of FIG. 1, the method for discovery and enumeration proceeds as follows. For explanatory purposes, assume that Device 102 has the lowest Media Access Control ("MAC") address, which may be used to determine which of tow boundary devices is the master device. As the master device of the two boundary devices, Device 102 thus starts the discovery process. Device 102, being the master device, sends a discovery propagation packet on its internal port B with the arguments (prpg: 1, enum: 0), where prpg indicates that the packet has propagated through one device, and enum indicates that the device is not yet enumerated. Device 104 receives the discovery propagation packet on its internal port C, and sends a discovery propagation packet on the other internal port D with the arguments (prpg: 1, enum: 0) (prpg: 2, enum: 0), wherein the prpg fields indicate that the packet has propagated through two devices, and the enum fields indicate that neither device is enumerated as of yet. Device 106 receives the discovery propagation packet on its internal port E. Since Device 106 is also a boundary device, it assigns the device identifier 3 to itself (as being the third device in the system) based on the discovery propagation packet indicating that two other devices were discovered in the system (i.e., the prpg fields). Device 106 also builds a device list of the daisy-chain devices, storing it locally. Device 106 also starts a synchronization timer, which provides sufficient delay for stack state synchronization for the devices in the daisy-chain system. Device 106 then sends a discovery enumeration packet on its internal port E with (prpg: 1, enum: 0) (prpg: 2, enum: 0) (prpg: 3, enum: 1), where the prpg fields indicate that three devices have had the propagation packet propagated through, and the enum fields indicate that only the third device has been enumerated.

Device 104 then receives the discovery enumeration packet on internal port D and assigns device identifier 2 to itself (i.e., the last identified device's identifier minus one). Device 104 also builds a device list of the daisy-chain devices that is stored locally, and starts a synchronization timer. Device 104 then forwards the discovery enumeration packet on internal port C with (prpg: 1, enum: 0) (prpg: 2, enum: 1) (prpg: 3, enum: 1), where the prpg fields indicate that three devices have had the propagation packet propagated through, and the enum fields indicate that the second device and the third device have been enumerated.

Device 102 receives the discovery enumeration packet on internal port B, and assigns the device identifier 1 to itself. Device 102 builds a device list of the daisy-chain devices, and starts a synchronization timer.

Figure 7:
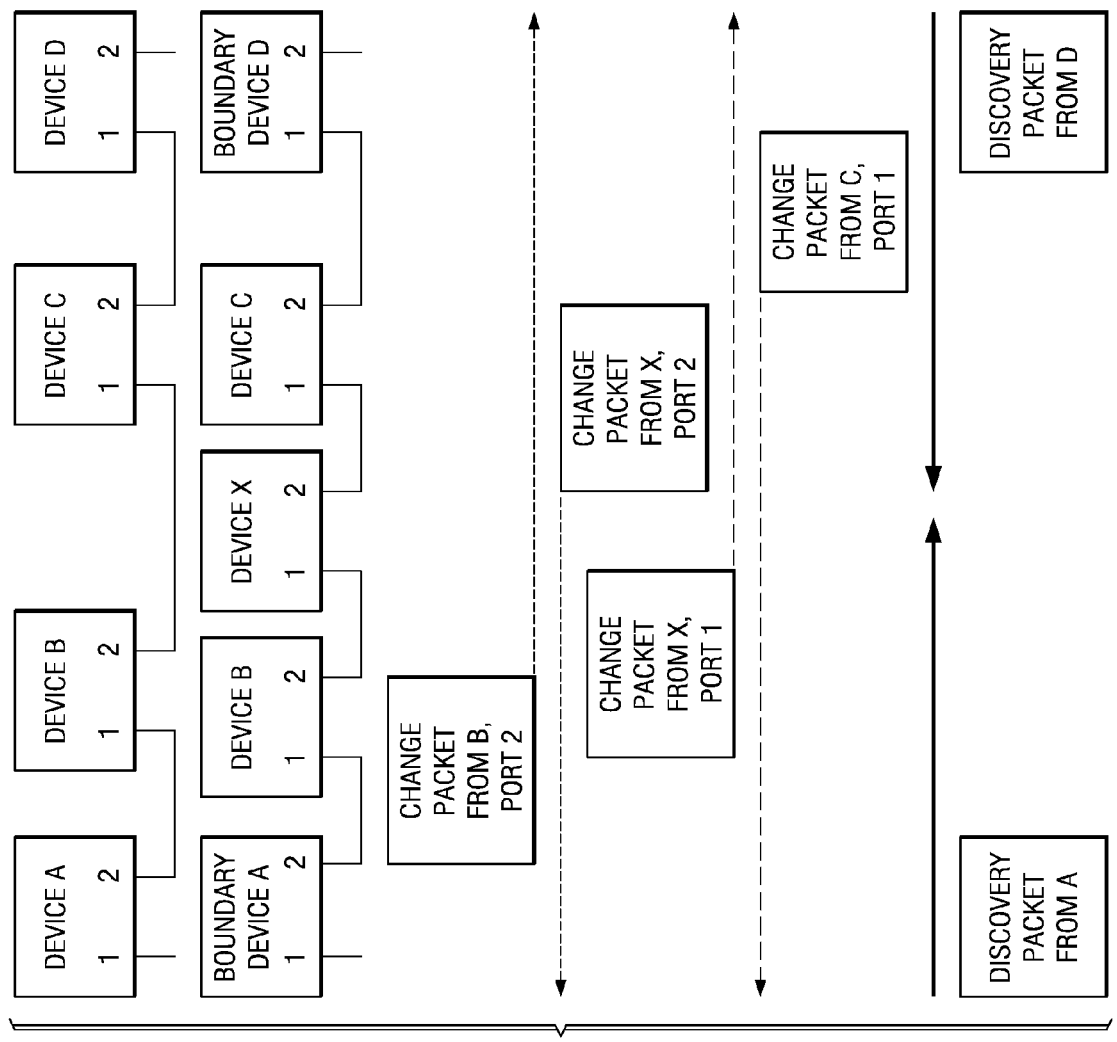
FIG. 7 shows a block diagram of an example of the method shown in FIG. 5 in accordance with an embodiment.

Various examples explained with respect to FIG. 7 may be further illustrative of the methods described above. A is a Boundary device, and D is a second Boundary device (as shown in the top half of FIG. 7).

Adding a Device Between the Boundary Devices

Suppose the device "B" and "C" are disconnected and a new device "X" is inserted between them (as shown in the bottom half of 7).

On device B, the Port 2 link goes down when device B is disconnected. When device X, Port 1 is connected to device B, Port 2, the link for device B, Port 2 comes back up. Both device B, Port 2 and device X, Port 1 wait for the predetermined interval of time for identifying their respective roles. Using the process mentioned earlier, the devices' ports identify themselves as internal ports. The same port identification procedure is also followed for device X, Port 2 and device C, Port 1.

After identifying the port roles, the devices perform a topology change propagation for the port in order to notify the other devices in the system that there is a topology change (i.e., that device X has been added). As shown in FIG. 7 in the finest dashed lines, for the connection between device B, Port 2 and device X, Port 1, device B generates a link change packet and sends the packet towards Boundary device D on device B's internal Port 2, while device X generates a link change packet and sends the packet towards Boundary device A on Device X's internal Port 1.

Similarly, for the connection between device X, Port 2 and device C, Port 1, two such link change packets are propagated from device X and device C respectively (as shown in the heavier dashed lines in FIG. 7). As shown, the boundary devices A and D receive the two link change packets. The timestamp of each Boundary device receiving these packets may differ. For each link change packet received, the respective boundary devices generate a discovery propagation packet and propagate the packet on their respective internal ports (as shown by the solid lines in FIG. 7). In the topology (or link) change packet, the source address of the packet identifies the device that has gone through a link change.

Removing a Boundary Device

Referring again to top half of FIG. 7, suppose that device A is removed from the system. Device B, port 1 becomes a boundary port. Device B generates a link change packet and sends it towards device C. After some delay, a discovery propagation packet is also sent. Device C, being intermediary in the top half of FIG. 7, forwards the packets on to the boundary device D. Boundary device D receives the link change packet first, and in response, generates one discovery propagation packet.

The discovery propagation packet from device B is received at device D, and the addresses for the two devices are compared in order to determine which device is the master device. Similarly, the discovery propagation packet from device D is received at boundary device B, and compared. Each boundary device determines which of the two boundary devices is the master device, and then enumerates the remaining devices in the chain accordingly. For example, the boundary device having the lesser MAC address is chosen as the master device, and assigned device id #1.

Adding a New Boundary Device

Suppose an additional device, not shown in the top half of FIG. 7, is added at one end of the chain (at device A), by connecting one of its ports to a boundary port of a boundary device (port 1 of device A). The new device then becomes the boundary device, with its port coupled to device A (that was previously the boundary device) becoming an internal port, and the other port becoming the boundary port. The new device identifies itself as having a link status change, and generates a link change packet and a discovery packet that are propagated to the other devices on the new device's internal port that is coupled to device A, port 1. Device A, port 1 becomes an internal port, and device A is no longer a boundary device.

Devices A, B, and C, being intermediary once the new device is coupled to port 1 of device A, forward the packets on to the other boundary device D. Boundary device D receives the link change packet first, and in response, generates one discovery propagation packet.

The discovery propagation packet from the new device (not shown) is received at device D, and the addresses for the two devices are compared in order to determine which device is the master device. Similarly, the discovery propagation packet from device D is received at the boundary device, and compared. Each boundary device determines which of the two boundary devices is the master device, and then enumerates the remaining devices in the chain accordingly. For example, the boundary device having the lesser MAC address is chosen as the master device, and assigned device id #1.

Control Token Based Management

Referring now to FIG. 8, a flowchart is shown for a method of control token based management of a daisy-chain system topology (i.e., block 308 of FIG. 3). The method begins with the master device being assigned ownership of a control token. Each time the system topology is re-discovered, as described above, the master device in the newly discovered system topology becomes the owner of the control token. The control token is used in management of the daisy-chain system as a single virtual device, as the control token ensures uniformity and synchronization of command execution across the devices of the daisy-chain system, such as configuration command execution.

In block 802, a peer device issues a system command, such as a configuration command to alter the configuration of devices in the daisy-chain system. In order to execute the system command, the peer device requests use of the control token from the master device (block 804). A check is performed to determine whether the control token is available from the master device at block 706. An example of the control token being unavailable is when another peer device has already requested and is using the control token. The system command fails if the control token is not available from the master device (block 808).

If the control token is available from the master device, the master device lends the control token to the peer device making the request (block 810). The peer device thus has exclusive control of the daisy-chain system while it has use of the control token (block 812), and the command executes (block 814). When the command is completed (e.g., configuration for each device in the daisy-chain system has been accomplished), the peer device returns the control token to the master device (block 816).

The obtaining and releasing of the token device is performed in the form of PDU exchanges. Similarly, the execution of configuration APIs and status of execution is also performed in the form of packet PDU exchanges.

Inasmuch as the systems and methods described herein were developed in the context of a LAN, the description herein is based on a LAN computing environment. However, the discussion of the various systems and methods in relation to a LAN computing environment should not be construed as a limitation as to the applicability of the systems and methods described herein to only LAN computing environments. One of ordinary skill in the art will appreciate that these systems and methods may also be implemented in other computing environments such as Personal Area Networks ("PANs"), Wide Area Networks ("WANs"), Metropolitan Area Networks ("MANs"), and other networks.

The above discussion is meant to be illustrative of the principles and various embodiments of this disclosure. Numerous variations and modifications will become apparent to those skilled in the art once the above disclosure is fully appreciated. For example, the scope of disclosure is not limited to daisy-chain systems of IP telephones, as illustrated herein. Any type of daisy-chain ethernet-based devices may be used. Additionally, any number of devices may be daisy-chain together, and discovered and managed according to embodiments of this disclosure. It is intended that the following claims be interpreted to embrace all such variations and modifications.

What is claimed is:

1. A method of auto-discovery and auto-enumeration, the method comprising:
    identifying each port of each device in a daisy-chain system of serially inter-connected devices, wherein identifying each port of each device further comprises:
        detecting a link status change on one of the ports on one of the devices in the daisy-chain system;
        if a packet is received on the port having the link status change during a predetermined interval of time, defining the port as a first boundary port;
        discovering each device in the daisy-chain system;
        if a packet is not received on the port during the predetermined interval of time, further comprising:
            sending an auto-negotiation message to a neighboring device in the system;
            if the same message is received in return from the neighboring device, defining the port as an internal port; and if the same message is not received in return from the neighboring device, defining the port as a first boundary port; and
enumerating each device in the daisy-chain system.

2. The method of claim 1, further comprising managing the daisy-chain system by executing commands issued by any device in the daisy-chain system if the device has been granted use of a control token.

3. The method of claim 1, wherein discovering each device in the daisy-chain system further comprises generating and propagating a propagation packet.

4. The method of claim 1, further comprising building a device list of the devices in the system and storing the device list locally on each device.

5. A method of auto-discovery and auto-enumeration, the method comprising:
identifying each port of each device in a daisy-chain system of serially inter-connected devices, wherein identifying each port of each device further comprises:
detecting a link status change on one of the ports on one of the devices in the daisy-chain system;
if a packet is received on the port having the link status change during a predetermined interval of time, defining the port as a first boundary port; discovering each device in the daisy-chain system,
if a packet is not received on the port during the predetermined interval of time, further comprising:
changing content stored in an auto-negotiation register for the port in a predetermined sequence;
comparing the predetermined sequence to an advertised sequence of changes made to an auto-negotiation register for the connected port of a neighboring device;
if the sequences are the same, defining the port as an internal port; and
if the sequences are not the same, defining the port as a first boundary port; and
enumerating each device in the daisy-chain system.

6. The method of claim 5, wherein enumerating each device in the system further comprises:
assigning an identification number to the device of a second boundary port device; and
at each device, assigning an identification number to each device that is one less than the identification number of the previous device in the system.

7. The method of claim 5, wherein enumerating each device in the system further comprises generating a discovery enumeration packet at a second boundary port device; and
forwarding the enumeration packet to each device in the system until the enumeration packet is received by the first boundary port device.

8. The method of claim of claim 6, wherein discovering and enumerating each device is initiated by a master device in the system, wherein the master device is selected based on a comparison of a Media Access Control ("MAC") address for the first boundary device and a Media Access Control ("MAC") address of the second boundary device.

9. A device, comprising:
an ethernet switch having at least two ports;
a control logic operable to:
identify each of the ports as an internal port or a boundary port, wherein in identifying each of the ports as an internal port or a boundary port, the control logic is further operable to:
detect a link status change on one of the ports;
if a packet is received on the port during a predetermined interval of time, define the port as a first boundary port, discover any device connected in a daisy-chain fashion to any identified internal port;
wherein in identifying each of the ports as an internal port or a first boundary port, the control logic is further operable to:
send an auto-negotiation message to a neighboring device;
if the same auto-negotiation message is received in return from the neighboring device, define the port as an internal port; and
if the same auto-negotiation message is not received in return from the neighboring device, define the port as the first boundary port; and
enumerate any such discovered device connected in a daisy-chain fashion to any identified internal port.

10. The device of claim 9, wherein in identifying each of the ports as an internal port or a first boundary port, the control logic is further operable to:
change content stored in an auto-negotiation register for the port in a predetermined sequence;
compare the predetermined sequence to an advertised sequence of changes to an auto-negotiation register for a neighboring port of a neighboring device connected to the port of the device;
if the sequences are the same, define the port as an internal port; and
if the sequences are not the same, define the port as the first boundary port.

11. The device of claim 9, wherein in discovering any device connected in a serial fashion to any identified internal port, the control logic is further operable to generate and propagate a propagation packet.

12. The device of claim 9, wherein in enumerating any such discovered device, the control logic is further operable to assign an identification number to the device where the identification number is equal to the total number of devices connected via an internal port if the device identifies at least one of its ports as a first boundary port and the device is not a master device.

13. The device of claim 9, wherein in enumerating any such discovered device, the control logic is further operable to assign an identification number to the device equaling one if the device identifies at least one of its ports as a first boundary port and the device is a master device.

14. The device of claim 9, wherein in enumerating any such discovered device, the control logic is further operable to assign an identification number that is one less than the identification number of the most recent previously enumerated device in the system if the device identifies both of its ports as internal ports.

15. The device of claim 14, wherein in enumerating any such discovered device, the control logic is further operable to generate a discovery enumeration packet at any port identified as a first boundary port, and forward the discovery enumeration packet to any device connected via an internal port.

16. A daisy-chain system, comprising:
a plurality of devices inter-connected together in a daisy-chain; the boundaries of the system defined by a first boundary port of a first device in the system and a second boundary port of a second device in the system; each device operable for auto-discovery and auto-enumeration, each device comprising:
an ethernet switch having at least two ports;
a control logic operable to:
identify each of the ports as an internal port or a boundary port;

discover any device connected in a daisy-chain fashion to any identified internal port; and enumerate any such discovered device connected in a daisy-chain fashion to any identified internal port, detect a link status change on one of the ports;

if a packet is received on the port during a predetermined interval of time, define the port as a boundary port;

if a packet is not received on the port during the predetermined interval of time, implement at least one of the following auto-negotiation techniques:

1) send an auto-negotiation message to a neighboring device;

if the same message is received in return from the neighboring device, define the port as an internal port; and if the same message is not received in return from the neighboring device, define the port as a boundary port; and 2) change content stored in an auto-negotiation register for the port in a predetermined sequence; compare the predetermined sequence to an advertised sequence of changes to an auto-negotiation register for a neighboring port of a neighboring device connected to the port of the device;

if the sequences are the same, define the port as an internal port; and if the sequences are not the same, define the port as a boundary port.

17. The daisy-chain system of claim 16, wherein the control logic is further operable to:

detect a topology change in the daisy-chain system; and propagate the topology change to each device in the daisy-chain system;

wherein the topology change comprises at least one of 1) an additional device is connected to the daisy-chain system, 2) a device is disconnected from the daisy-chain system, 3) a device in the daisy-chain system is powered on, and 4) a device in the daisy-chain system is powered off.

18. The daisy-chain system of claim 16, wherein the control logic is further operable to generate and forward a propagation packet to each device in the system, and generate and forward an enumeration packet to each device in the system.

\* \* \* \* \*